July 27, 1937.　　　　H. S. RYLAND　　　　2,088,536
CONTINUOUS FEED CINEMATOGRAPH APPARATUS
Filed Feb. 5, 1935　　　4 Sheets-Sheet 1
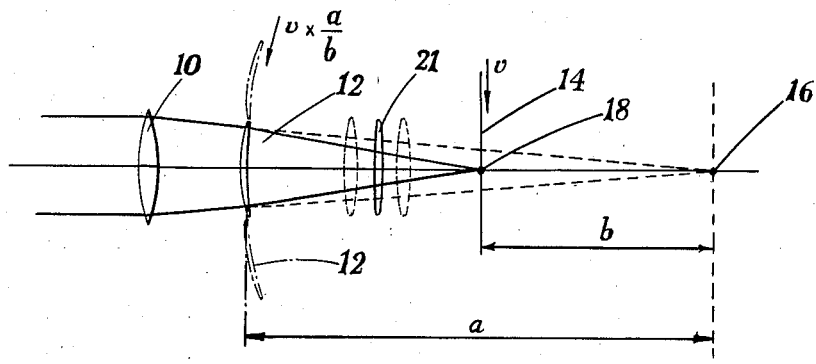
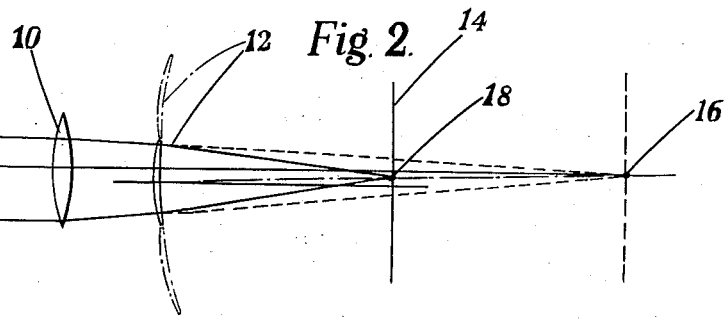
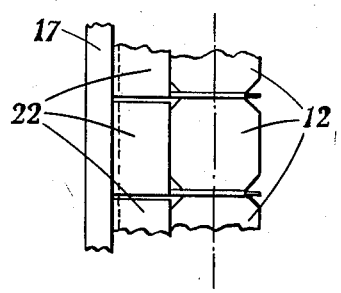

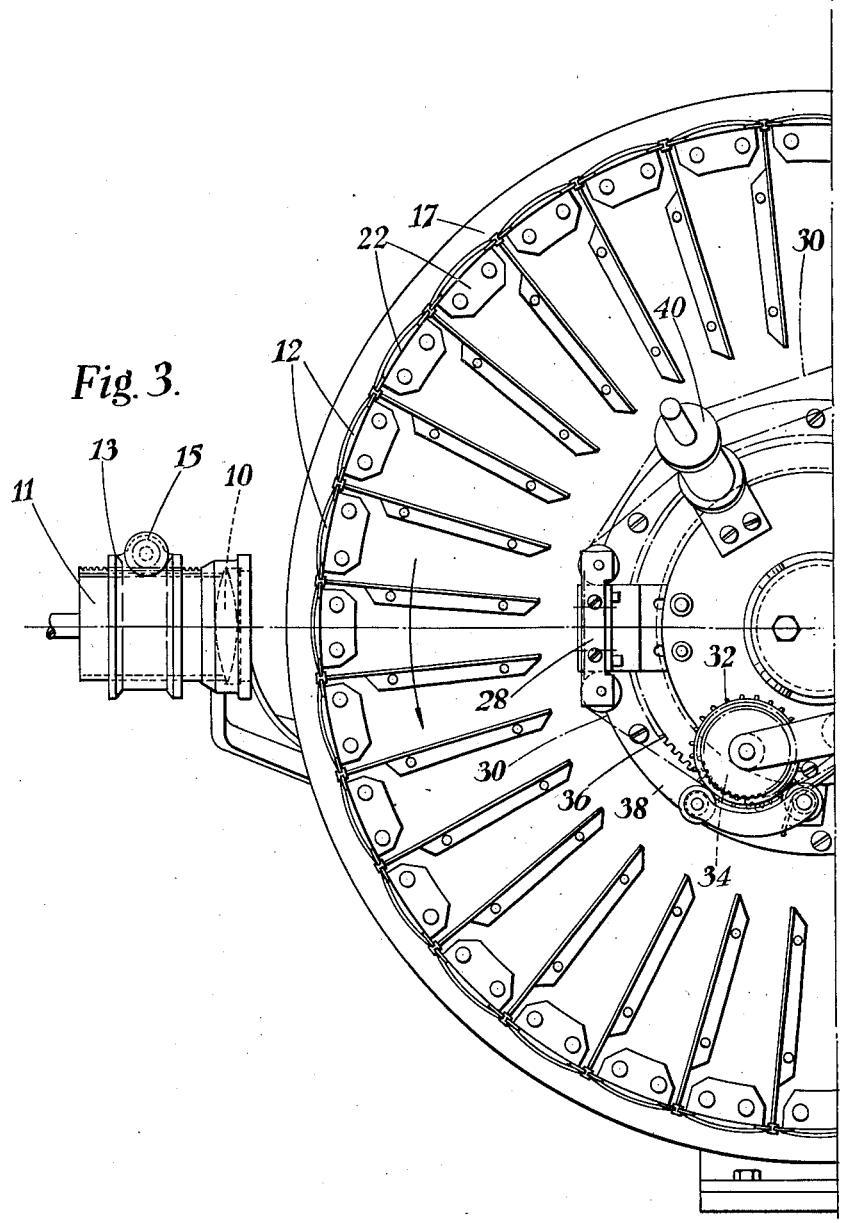

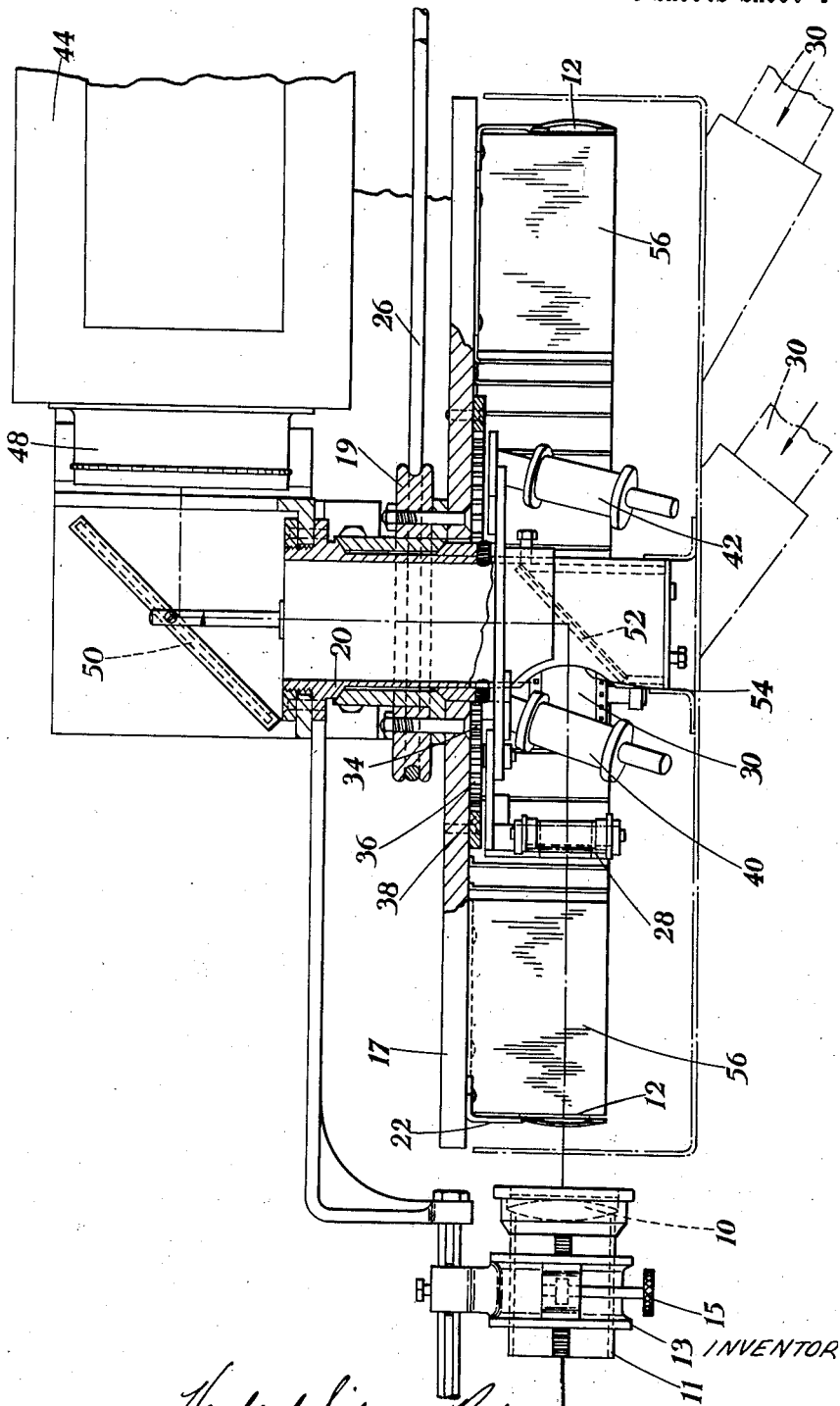

Patented July 27, 1937

2,088,536

UNITED STATES PATENT OFFICE 2,088,536

CONTINUOUS FEED CINEMATOGRAPH APPARATUS

Herbert Sidney Ryland, Catford, England

Application February 5, 1935, Serial No. 5,127
In Great Britain February 6, 1934

1 Claim. (Cl. 88—16.8)

This invention relates to optical systems for use in cinematography, whether for taking cinematograph pictures or for projecting them. The principal object of the invention is to enable the film to be moved in a continuous manner instead of intermittently. A further object is to provide means whereby the operator can adjust the optical conditions to obtain a projected image on the screen which is stationary notwithstanding that the film from which it is projected is moving continuously.

The invention belongs to that class of device in which a rotating optical element is used for producing relative movement, in a direction transverse to the optical axis, between the conjugate foci of the objective lens which forms the image. According to this invention the optical element consists of a number of collective lenses mounted in the form of a ring on a rotating member so that they are interposed in turn between the continuously moving film and the objective lens. The principal focus of the system comprising the objective lens and any one of the collective lenses is nearer to the objective lens than is the principal focus of the objective lens itself. The film is, of course, placed at the principal focus of the said system. The collective lens may then be regarded as forming a virtual image of the film, which virtual image occupies the position of the principal focus of the objective lens alone. The film is moved continuously perpendicularly to the optical axis and the collective lenses are moved in the same sense but at a higher speed than the film. The ratio between the linear speed of the collective lenses and the linear speed of the film is made equal to the ratio between the distance from the rear principal point of any one of the collective lenses to the virtual focus aforesaid, and the distance from the film to the said virtual focus.

The rotating member carrying the aforesaid collective lenses is mounted to rotate on a fixed tubular spindle within which is a reflecting surface and means are provided for projecting light along the interior of the hollow spindle, which light is reflected by the reflecting surfaces radially outwards through the film, the collective lenses and the objective lens.

Referring to the accompanying drawings,

Figure 1 is a diagram showing the optical system according to this invention,

Figure 2 is a similar diagram showing the parts in a different position,

Figure 3A:
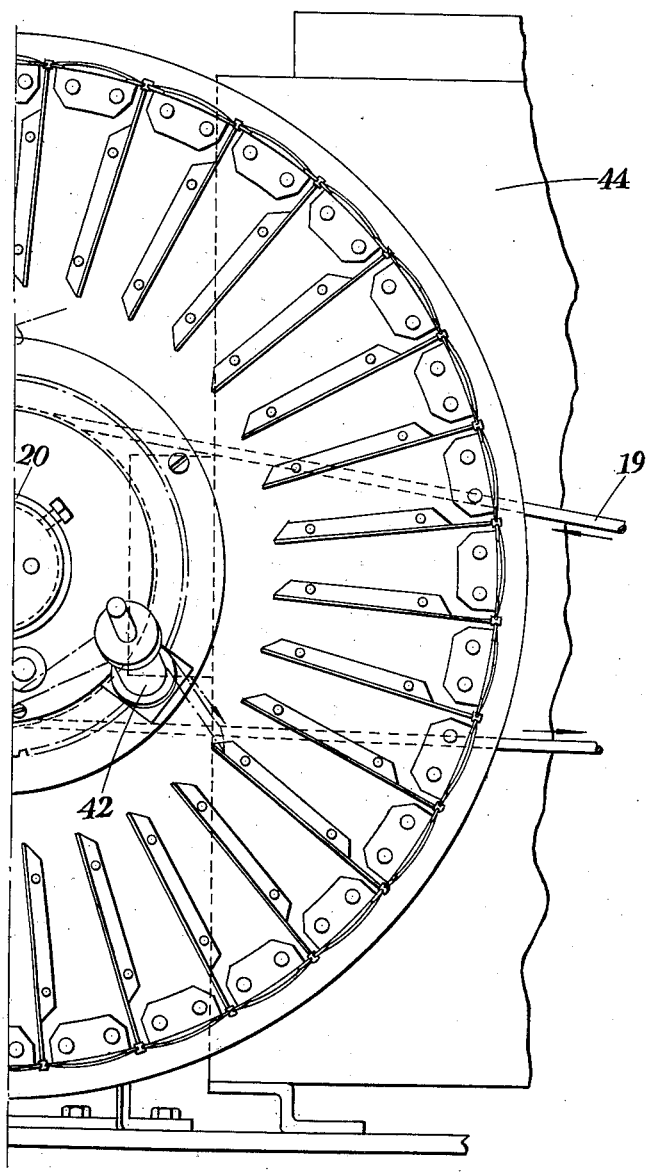

Figures 3 and 3a together constitute a side elevation of a cinematograph projector embodying the invention, Figure 4 is a plan of Figures 3 and 3a partly in section, and Figure 5 is a front elevation of a part of the ring of collective lenses.

Referring first to Figure 1, 10 is an objective lens represented diagrammatically as a simple double-convex lens, 12 represents a series of non-achromatic lenses arranged in the form of a rotatable ring with their optical axes radial to the axis of rotation of the ring and 14 represents a film which is sensitive film in the case of a cinematograph camera and a positive transparency in the case of a projector. The figure may be taken to represent either a camera or a projector. The point 16 is the principal focus of the objective lens 10, and the point 18 on the film 14 is the principal focus of the system consisting of the two lenses 10 and 12. The film 14 is moved continuously in the direction of the arrow at a speed $v$, and the lenses 12 are moved in the direction of the arrow so that their rear principal points have a velocity equal to $$v \times \frac{a}{b}$$

where $a$ is the distance from the rear principal point of the lens 12 to the point 16 and $b$ is the distance from the point 18 to the point 16.

In Figure 1 the axis of the lens 12 is coincident with the axis of the lens 10. In Figure 2 the axis of the lens 12 is displaced downwards and the point 18 on the film is also displaced downwards, the displacement of the lens being $$\frac{a}{b}$$

times the displacement of the point 18. It will be clear that under these conditions the virtual image of the points 18 formed by the lens 12 will still be at the point 16 on the axis of the lens 10. Thus, in the case of a projector the image of the point 16 projected on to the screen by the lens 10 will occupy the same position as it did when the lens 12 was co-axial with the lens 10 as in Figure 1. In the case of a camera the image of a stationary point in the scene being photographed, which would have been formed at the point 16 on the axis in the absence of the lens 12, will instead be formed at the point 18 on the film, which point is stationary with respect to the film. A lens 21 which may be either collective or dispersive may be mounted in front of the film so as to be adjustable by hand in known manner. This lens is of weak power and is used to vary the effective power of the lenses 12. If it is placed near the film its effect is negligible and its effect increases as it is moved away from the film. Such an adjusting lens can be used in a projector to secure by trial the exact conditions necessary to maintain the projected image stationary upon the screen.

Referring now to Figures 3, 3a, 4 and 5 which represent a projector according to this invention, the objective lens 10 is shown mounted in a tube 11 sliding in a sleeve 13 and movable therein for focussing by means of a focussing knob 15. A disc 17 carrying a belt pulley 19 is mounted to rotate freely upon a tubular spindle 20. The disc 17 has fixed to it near its periphery a series of thirty-two right-angled brackets 22 which together form a regular polygon and to the edge of each bracket is fixed a collective lens 12. All the lenses 12 are of equal focal length and they may be simple double-convex non-achromatic lenses, the objective lens 10 being preferably over-corrected chromatically to compensate for the chromatic aberration of the lenses 12. The parts are so arranged that the axis of each lens 12 comes into coincidence with the axis of the lens 10 as the disc is rotated. This rotation is effected by means of a belt 26 passing around the pulley 19 and driven by a suitable source of power.

A film gate 28 is supported by the fixed spindle 20 with its centre on the axis of the lens 10, and the film 30 is driven by a sprocket wheel 32 to which is secured a gearwheel 34 meshing with internal teeth 36 on a ring 38 fixed to the disc 17. The film is led from a supply reel (not shown) over a guide roller 40 the axis of rotation of which is inclined as shown, and it is led to a take-up reel (also not shown) over a similar inclined guide roller 42. The purpose of the inclination of the axes of the guide rollers is to give the film a twist sufficient to enable it to clear the outer edges of the lenses 12.

The sprocket 32 imparts to the film a linear speed which is half the linear speed of the rear principal points of the lenses 12. The point 16 which in the absence of the lenses 12 would be in focus on the screen is as far behind the film 30 as the rear principal point of one of the lenses 12 is in front of the film. Thus, the ratio $$\frac{a}{b}$$

is equal to 2 in this particular case although it might have any other value provided that it is equal to the ratio of the two linear velocities.

The lamphouse 44 contains a source of light (not shown) the light from which after passing through a condenser 48 is reflected along the hollow spindle 20 by a plane metal mirror 50 which is preferably water cooled. A second mirror 52 mounted within the hollow spindle 20 at an angle of 45° to its axis reflects the light through an aperture 54 in the side of the spindle on to the film. It would of course be possible to arrange the lamphouse 44 in line with the spindle 20, in which case the mirror 50 would be eliminated, but it is preferred to use the arrangement shown as it is more compact.

The space between each lens 12 and the film gate is bounded by a pair of radial partitions 56 secured to the disc 17. This ensures that no scattered light shall be projected on to the screen.

When the disc 17 is turned slowly enough to enable the sequence of operations to be observed on the screen there is, of course, a moment at which the image of one complete frame fills the screen. As the rotation continues a narrow line of demarcation moves downwards across the screen but the picture or image remains complete. As the line of demarcation progresses across the screen the part of the image below it is an image of the frame which is leaving the gate and the part of the image above it is due to the frame which is entering the gate. Thus, if these two frames represent a still picture no change is seen on the screen at all; the narrow line of demarcation passes across the screen but the image as a whole does not change. If any part of the scene which was taken moved between the two exposures then the change of position of that part will take place progressively on the screen as the line of demarcation moves across it. The screen is illuminated at all times and thus not only are the steps of movement from one frame to the next performed gradually upon the projected picture but there is a complete absence of intermittence of illumination. The result is that the flickering which is seen in ordinary cinematograph projections is almost completely absent.

The camera according to this invention has the same essential features as are shown in the drawings and it is deemed to be unnecessary to illustrate the camera separately. In either case no shutter is required and the screen in the case of the projector or the sensitive film in the case of a camera is illuminated continuously. This is especially advantageous in the case of a camera because the effective exposure time is longer than it can be in normal cinematograph cameras with intermittent feed and a shutter.

In the foregoing description and in the claim appended hereto it is assumed for the sake of simplicity that the object photographed in the case of a camera or the screen in the case of a projector is at infinite distance, and the optical conditions of the system have been referred to the principal focus. It is to be understood that as the object or the screen, as the case may be, is at a finite distance the term "principal focus" should be taken to mean the actual focus of the object or of the screen.

I claim:—

A cinematograph projector comprising in combination an objective lens, a rotatable disc, a fixed tubular spindle therefor, a ring of similar collective lenses mounted upon said disc with their axes radial to the axis of rotation thereof, means for rotating said disc to bring each of the collective lenses in turn behind and co-axial with the objective lens, means for continuously feeding a film across the axis of the objective lens in the same direction as the movement of the collective lenses across said axis but at a lower speed, said film being situated at the principal focus of the system comprising the objective lens and any one of the collective lenses, means for projecting light along the interior of the hollow spindle and a reflecting surface within said hollow spindle adapted to reflect said light through the film, the collective lenses and the objective lens.

HERBERT SIDNEY RYLAND.